No. 799,231. PATENTED SEPT. 12, 1905.
S. W. GATES.
HAY FORK.
APPLICATION FILED AUG. 15, 1904.

Witnesses
M. C. Lyddane
P. H. Greenbauer

Inventor
Silas W. Gates
by H. B. Wilson
Attorney

UNITED STATES PATENT OFFICE.

SILAS W. GATES, OF BIGTIMBER, MONTANA.

HAY-FORK.

No. 799,231.      Specification of Letters Patent.      Patented Sept. 12, 1905.

Application filed August 15, 1904. Serial No. 220,875.

*To all whom it may concern:*

Be it known that I, SILAS W. GATES, a citizen of the United States, residing at Bigtimber, in the county of Sweet Grass and State of Montana, have invented certain new and useful Improvements in Hay-Forks; and I do declare the following to be a full, clear, and exact description of the invention, such as will enable others skilled in the art to which it appertains to make and use the same.

My invention relates to improvements in hay-forks; and it consists in the construction, combination, and arrangement of devices hereinafter described and claimed.

Figure 1:
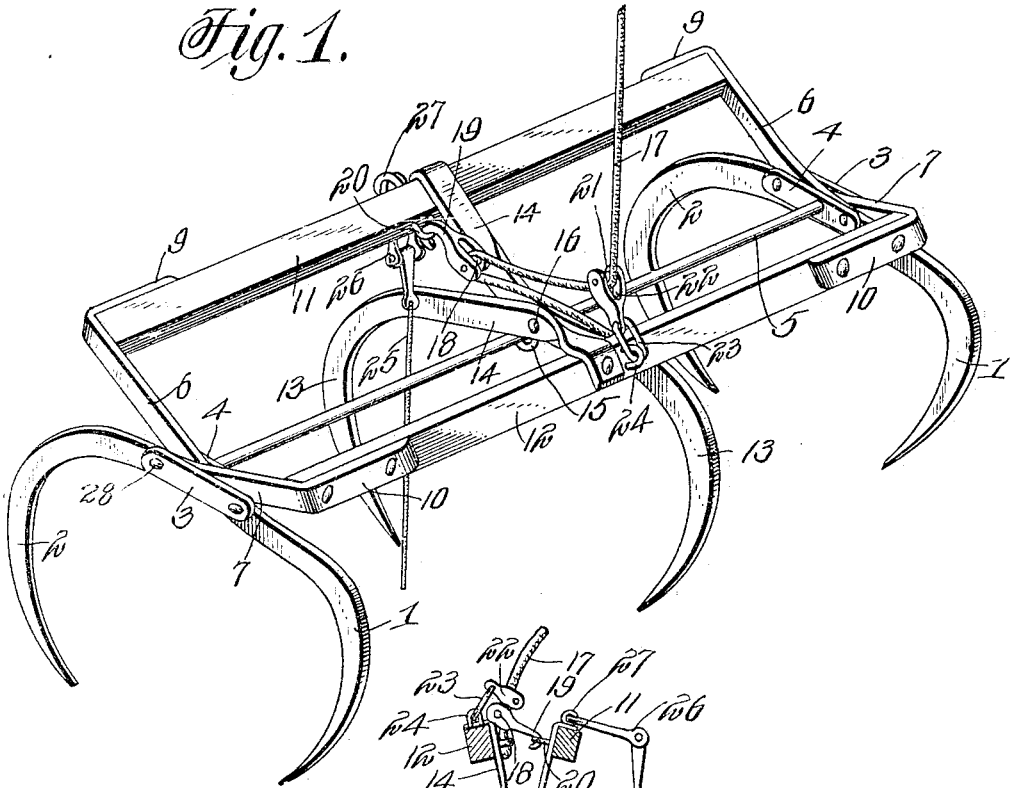
Figure 2:
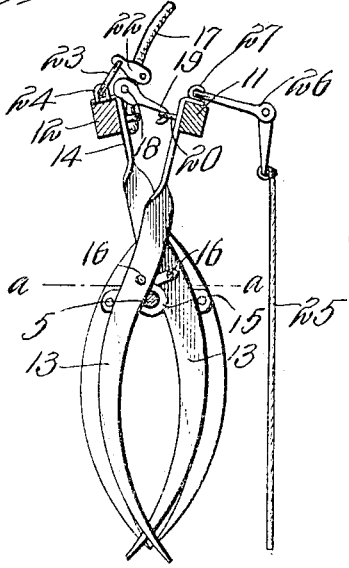
Figure 3:
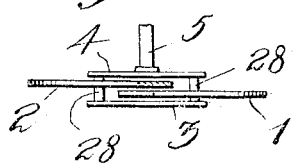

In the accompanying drawings, Figure 1 is a perspective view of a horse hay-fork embodying my improvements, showing the same open. Fig. 2 is a transverse sectional view of the same, showing the fork closed. Fig. 3 is a detail section taken on the plane indicated by the line *a a* of Fig. 2 and showing the fork closed.

The ends of the tines 1 2 of my improved fork, which are oppositely curved, as shown, are pivoted between the cross-plates 3 4 by means of rivets or other suitable devices 28, which connect the ends of the said cross-plates together, the tines lying in the spaces between the said cross-plates. The cross-plates 4 are secured to the ends of a bar 5. The said tines are respectively provided with upwardly-extending arms 6 7, the upper ends of which are bent toward each other laterally with respect to the tines, as at 9 10, and are secured to the outer sides of handle-bars 11 12, respectively. I also provide a suitable number of pairs of intermediate tines 13, one pair of such tines being here shown as disposed midway between the end tines. The said intermediate tines have upwardly-extending arms 14, which are secured to the handle-bars 11 12, and the said intermediate tines are pivotally connected to the bar 5 by means of hooks 15, which are secured to the said intermediate tines by bolts 16. The said intermediate tines may be increased in number according to the size of the fork and the kind of hay to be handled by the fork. To one of the handle-bars, at the center thereof, is attached one end of the hoisting rope or chain 17. The same engages a sheave 18, carried by a hook 19, which is adapted to engage a keeper 20, with which the handle-bar 11 is provided, said keeper being on the inner side of the center of the said handle-bar. The hoisting rope or chain also engages a sheave 21 in a block 22, which is connected to the center of the handle-bar 12 by a link 23 and an eyebolt 24.

It will be understood that when the rope or chain is operated to hoist the fork it will first by its coaction with the sheaves connected to the respective handle-bars of the fork move said handle-bars toward each other, and thereby close the tines of the fork, so as to engage them with the hay, and thus load the fork therewith. When the fork is lowered and the hoisting rope or chain slackened, the fork may be opened by drawing upon the rope 25, which is here shown as attached to a link 26, which is connected to the center of the handle-bar 11 by an eyebolt 27.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A fork of the class described, comprising a rod having cross-plates at its ends, end tines pivotally connected in pairs to the said cross-plates, said end tines having arms forming extensions at their upper ends, handle-bars to which the said arms are attached, and intermediate tines connected to the said rod and having arms secured to the said handle-bars, substantially as described.

2. A hay-fork of the class described, comprising a rod having cross-plates at its ends, pairs of end tines pivotally connected to the said cross-plates and having upwardly-extending arms, handle-bars to which the said upwardly-extending arms are secured, intermediate tines having arms secured to the said handle-bars and further provided with pivotal devices connecting them to the said rod, substantially as described.

In testimony whereof I have hereunto set my hand in presence of two subscribing witnesses.

SILAS W. GATES.

Witnesses:
     CHAS. R. GATES,
     J. A. ELLIOT.